E. M. YATES.
TIGHTENER FOR DRUMHEADS.
APPLICATION FILED JAN. 17, 1910.
955,736.
Patented Apr. 19, 1910.
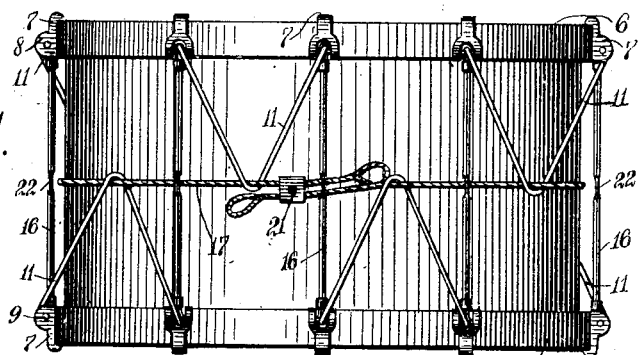
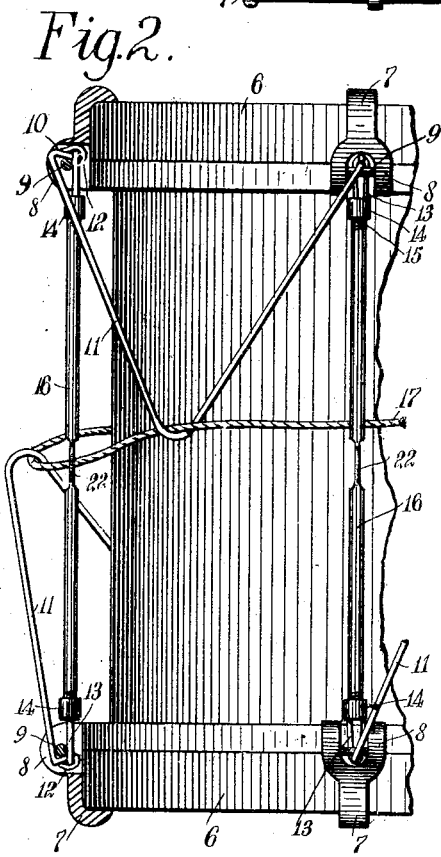
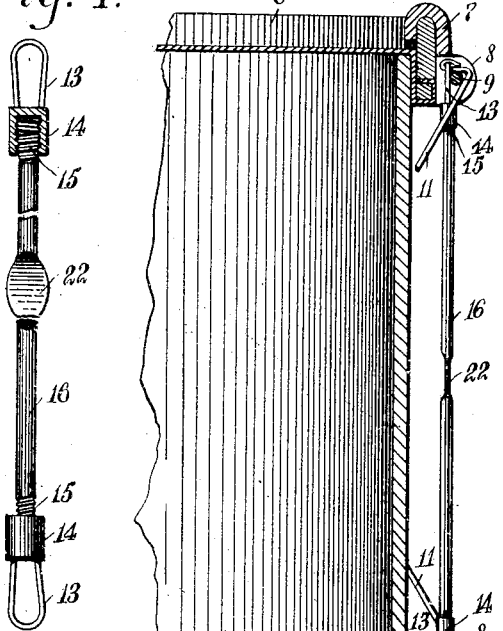
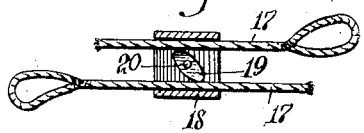
WITNESSES:
George Bambay
C. F. Murdock
INVENTOR
Edgar M. Yates
BY Munn & Co
ATTORNEYS
ANDREW B. GRAHAM CO., PHOTO-LITHOGRAPHERS, WASHINGTON, D.C.

UNITED STATES PATENT OFFICE.

EDGAR MURRY YATES, OF NORMAN, OKLAHOMA.

TIGHTENER FOR DRUMHEADS.

955,736. Specification of Letters Patent. Patented Apr. 19, 1910.

Application filed January 17, 1910. Serial No. 538,572.

*To all whom it may concern:*

Be it known that I, EDGAR MURRY YATES, a citizen of the United States, and a resident of Norman, in the county of Cleveland and State of Oklahoma, have invented a new and Improved Tightener for Drumheads, of which the following is a full, clear, and exact description.

Among the principal objects which the present invention has in view are: to provide means for quickly tightening the heads of drums; to provide means for adjusting the tightening devices individually and for operating the same collectively; and to provide a strong, simple and efficient construction for drum bodies and head tighteners.

One embodiment of the present invention is disclosed in the structure illustrated in the accompanying drawings, in which like characters of reference denote corresponding parts in all the views, and in which—

Figure 1 is a side elevation of a drum constructed and arranged in accordance with the present invention; Fig. 2 is a fragmentary view on an enlarged scale, of the side of a drum constructed and arranged in accordance with the present invention, the fastening devices being shown in partially loosened condition; Fig. 3 is a fragmentary view in vertical section and on an enlarged scale, of a drum constructed, equipped and arranged in accordance with the present invention; Fig. 4 is an enlarged view in detail, of one of the individual tightening devices; and Fig. 5 is a detail view, fragmentary and diagrammatic, of the securing device for retaining in fastened position the various tighteners.

The head rims 6, 6 are provided with bracket hooks 7, 7, which extend over and engage the said rims so that the same may be drawn toward each other. The hooks 7, 7 have a bifurcated inner extension 8, between the bifurcated members whereof is extended a pivot pin 9. The pins 9, 9 are provided as fulcrum members, upon which the short ends 10, 10 of double extension V-shaped levers 11, 11 rest. The short ends 10, 10 of the levers 11, 11 are hooked, as at 12, the hooks being provided to extend through loops 13. The loops 13 are provided with threaded nipples 14, 14, which are engaged with the threaded ends 15, 15 on a rod 16. The nipples 14, 14 are of sufficient length that the ends 15, 15 may be screwed into the said nipples to vary the length of the combined rod 16 and loops 13, 13.

As many rods 16, with their attached loops 13, are provided as required to connect the hooks 7, 7 in pairs. When being adjusted in position the double extension levers 11, 11 are placed in position wherein the short ends 10, 10 of the said levers extend over the pins 9, 9 and engage the loops 13, 13. In the relaxed position of the parts the lever 11 is extended horizontally or inclined upward from the pins 9, 9.

To tighten the drum heads the levers 11 are depressed upon the median section of the drum body. The depression referred to is facilitated by a holding line 17. The holding line 17 may be formed from suitable cord, rope or wire, and is preferably flexible in character. The loose ends of the line 17 are passed through a clamp 18, in which is pivotally mounted a rocking double extension cam 19. The cam 19 is pivoted at 20 between the sides of the clamp 18, and is provided on the outside thereof with a key piece 21. The key piece 21 is used to adjust the cam 19 in such position that the ends of the line may be withdrawn from or loosened in the clamp 18.

In the operation of a device thus constructed and arranged, with the tightening or loosening of the line 17 results the universal tightening or loosening of the heads of the drum. It is also obvious that, by reason of the excessive leverage of the levers 11, 11, the force necessarily exerted to depress the V-shaped ends of the levers is exceedingly small. It is also obvious that when it becomes desirable to tighten any particular section of the head, this may be accomplished by removing any one or more of the rods 16, and when removed, screwing up the nipples 14 and the loops 13 attached thereto. The result, as outlined, of this operation is to shorten the combined lengths of the rods 16 and loops 13, and to compel the sections of the heads to which the said rods and loops are attached to more closely approach each other when thereafter the lever 11 is depressed into the tightening or locking position.

The rods 16, 16 are rotated by means of flattened finger holds 22, 22. The screw threads 15, 15 on the rods 16, 16 when thus provided are pitched in opposite directions, that is, the one thread is so called right hand pitch, while the other thread is a left hand pitch. By this arrangement the two nipples 14, 14 are drawn toward each other when turning the said rods 16, 16 in one direction, and removed from each other when turning the said rods in the other direction. By this means a special tightening of the drum heads may be readily effected.

Having thus described my invention, what I claim as new and desire to secure by Letters Patent is:—

1. A tightener for drum heads, comprising a plurality of hooks adapted to engage the drum head rims; a plurality of connecting rods for said hooks; and means for connecting the said hooks and rods, said means embodying a lever member for retracting the said hooks upon the said rods.

2. A tightener for drum heads, comprising a plurality of hooks adapted to engage the head rims of a drum in holding relation; a plurality of connecting rods for said hooks, the ends of said rods being provided with engaging means; a fulcrumed member provided on said hooks to receive an engaging lever; and a plurality of engaging levers adapted to engage the ends of said rods to lift the same on said projections.

3. A tightener for drum heads, comprising a plurality of hooks adapted to engage the head rims of a drum in holding relation; a plurality of connecting members having loops formed in the end thereof; a plurality of fulcrum members fixedly mounted in said hooks; and a plurality of levers adapted to rest upon said projections to engage said loops to draw the said connecting members and hooks together.

4. A tightener for drum heads, comprising a plurality of hooks adapted to engage the head rims of a drum in holding relation; fulcrum pins mounted in the lower end of said hooks; a plurality of connecting members provided with looped ends and adjustable to vary the length thereof; and a plurality of levers adapted to extend over and fulcrum upon said fulcrum pins, to engage the said loop ends to draw the said connecting members and hooks to shorten the extension thereof.

5. A tightener for drum heads, comprising a plurality of hooks adapted to engage the head rims of a drum in holding relation; a bifurcated end for each of the said hooks; pins extended between the said ends; a plurality of connecting members adapted to extend between the said hooks; and a plurality of levers adapted to extend over said pins to engage the said connecting members to draw the said hooks and members together and thereby shorten their extension when the said levers are depressed.

6. A tightener for drum heads, comprising a plurality of hooks adapted to engage the head rims of a drum in holding relation, said hooks being bifurcated at the lower extension thereof; pins extended between the bifurcated ends of said hooks; a plurality of connecting members extended between said hooks and having looped ends juxtaposed to said pins; and a plurality of levers adapted to extend over said pins to engage said looped ends.

7. A tightener for drum heads, comprising a plurality of hooks adapted to engage the head ribs of a drum in holding relation thereto, said hooks having bifurcated lower extensions; a pin extended between the bifurcated ends of each of said hooks; a plurality of connecting rods extended between said hooks and having a screw threaded end; a loop mounted upon a screw threaded nipple adapted to engage said rod; and a plurality of levers adapted to rest over said pins to engage the ends of said rod and the loop thereon.

8. A tightener for drum heads, comprising a plurality of hooks adapted to engage the head rims of a drum in holding relation thereto, said hooks having a bifurcated lower extension; a pin extended between the bifurcated ends of each of said hooks; a connecting rod having at each end thereof a loop adapted to be juxtaposed to the said pins; means for varying the length of said rods; and a plurality of levers adapted to extend over the said pins to engage the said loops.

9. A tightener for drum heads, comprising a plurality of hooks adapted to engage the head rims of a drum in holding relation, said hooks being provided with fulcrum projections; a plurality of connecting rods adapted to extend between said hooks; a plurality of levers adapted to extend over said fulcrum projections to engage the ends of said rods; and means for locking the said levers in depressed position.

10. A tightener for drum heads, comprising a plurality of hooks adapted to engage the head rims of a drum in holding relation, said hooks being provided with fulcrumed projections; a plurality of connecting rods adapted to extend between said hooks; a plurality of double extension levers joined to form looped median holding members; and means adapted to be passed through said looped holding members to retain the said levers in depressed position.

In testimony whereof I have signed this specification in the presence of two subscribing witnesses.

EDGAR MURRY YATES.

Witnesses:
BEN WILLIAMS, Jr.,
GEO. G. GRAHAM.